(No Model.) 4 Sheets—Sheet 1.

J. H. TRACY.
MACHINE FOR MAKING WIRE FENCE.

No. 438,450. Patented Oct. 14, 1890.

Attest.
Geo. B. Selden
Wm. J. McPherson

Inventor.
John H. Tracy,
per R. F. Osgood,
Atty.

(No Model.) 4 Sheets—Sheet 2.
J. H. TRACY.
MACHINE FOR MAKING WIRE FENCE.
No. 438,450. Patented Oct. 14, 1890.

Attest.
Geo. B. Selden
Wm J. McPherson

Inventor.
John H. Tracy,
pr R. F. Osgood,
Atty.

(No Model.)  4 Sheets—Sheet 3.
J. H. TRACY.
MACHINE FOR MAKING WIRE FENCE.
No. 438,450.  Patented Oct. 14, 1890.
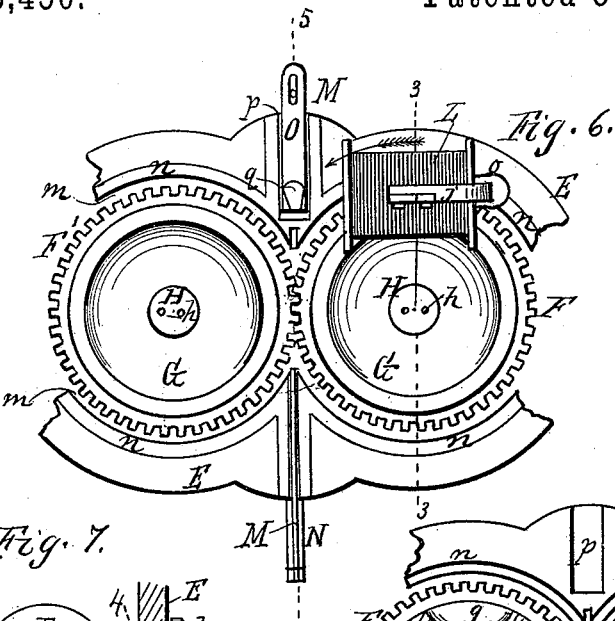
Fig. 6.
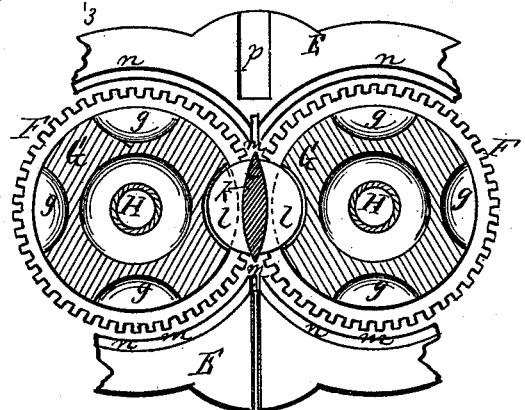
Fig. 8.
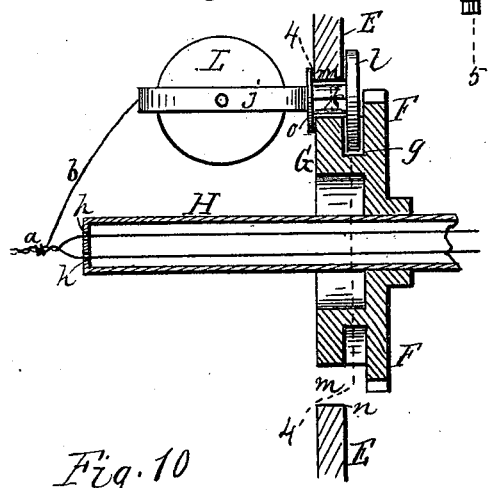
Fig. 7.
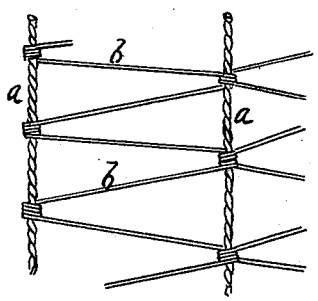
Fig. 10
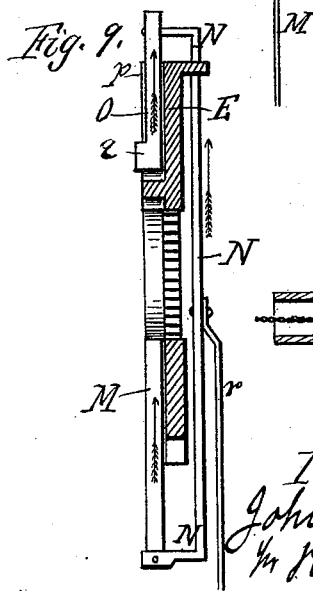
Fig. 9.
Fig. 11.
Attest.
Geo. B. Selden.
Wm. J. McPherson
Inventor.
John H. Tracy,
by R. F. Osgood,
Atty.
THE NORRIS PETERS CO., PHOTO-LITHO., WASHINGTON, D. C.

UNITED STATES PATENT OFFICE.

JOHN H. TRACY, OF PARMA, NEW YORK.

MACHINE FOR MAKING WIRE FENCE.

SPECIFICATION forming part of Letters Patent No. 438,450, dated October 14, 1890.

Application filed February 20, 1888. Serial No. 264,845. (No model.)

*To all whom it may concern:*

Be it known that I, JOHN H. TRACY, of Parma, in the county of Monroe and State of New York, have invented a certain new and useful Improvement in Machines for Making Wire Fence; and I do hereby declare that the following is a full, clear, and exact description of the same, reference being had to the drawings accompanying this specification.

My improvement relates to machines for making that class of wire fence in which longitudinal strands are employed with interwoven cross-wires; and the invention consists in the construction and arrangement of the machine, as hereinafter more fully described and definitely claimed.

Figure 1:
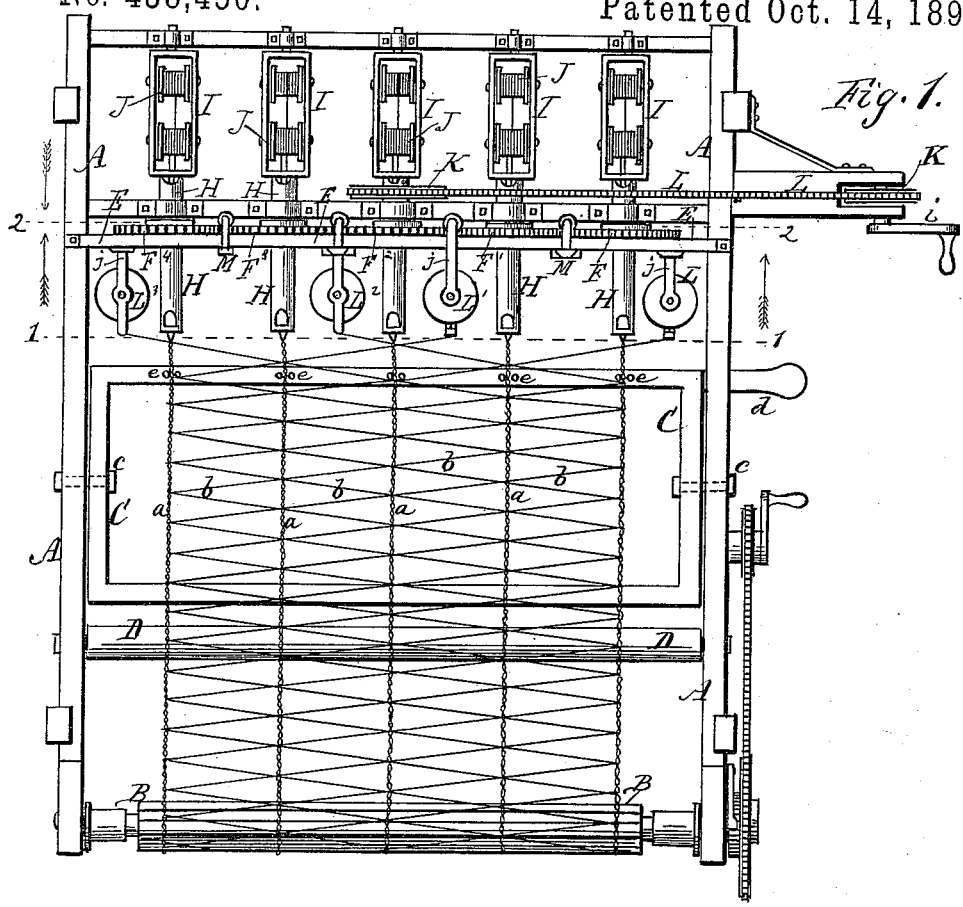
Figure 2:
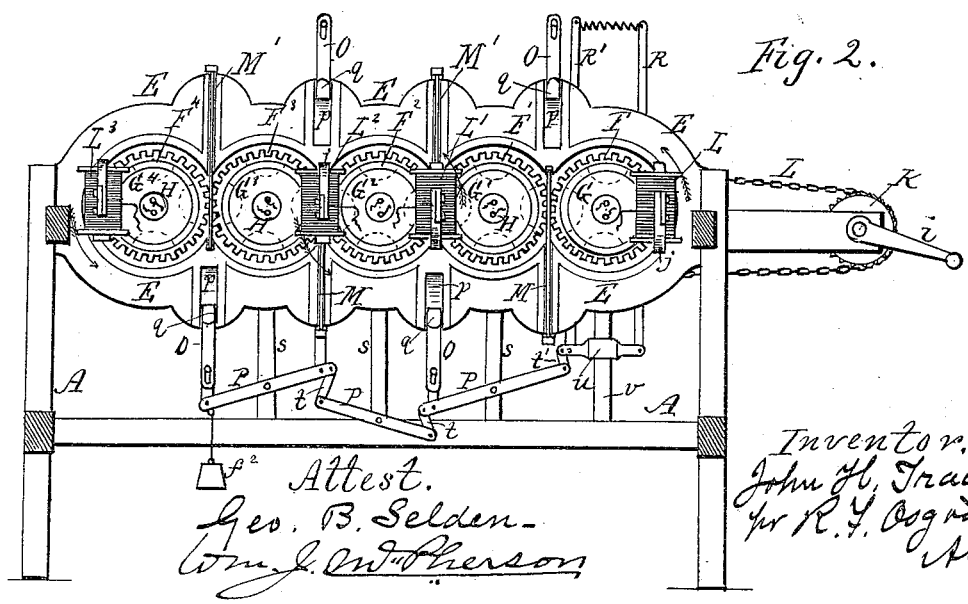
Figure 3:
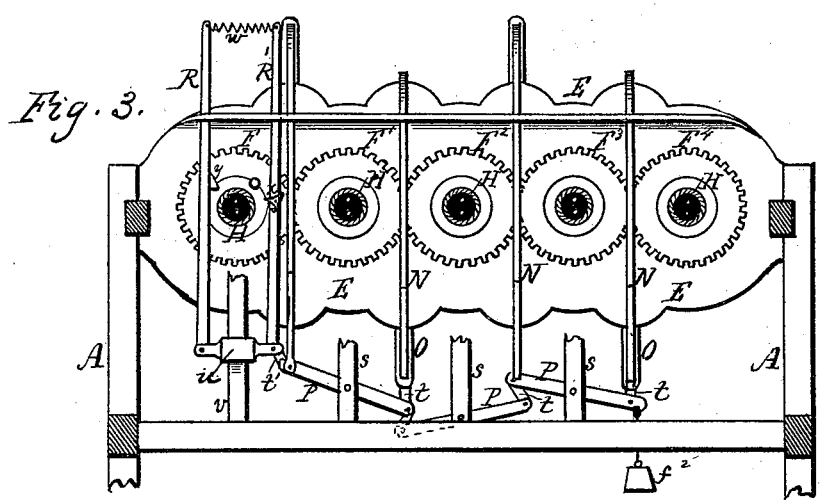
Figure 4:
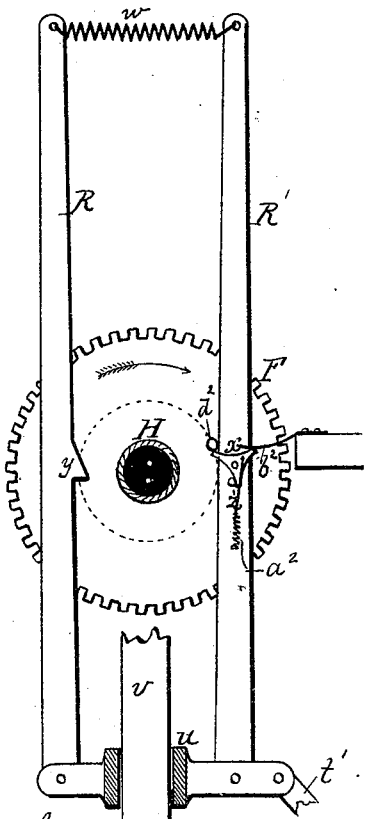
Figure 5:
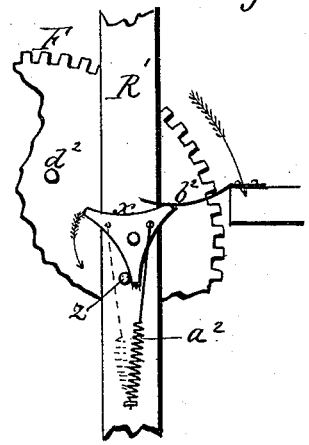
Figure 12:
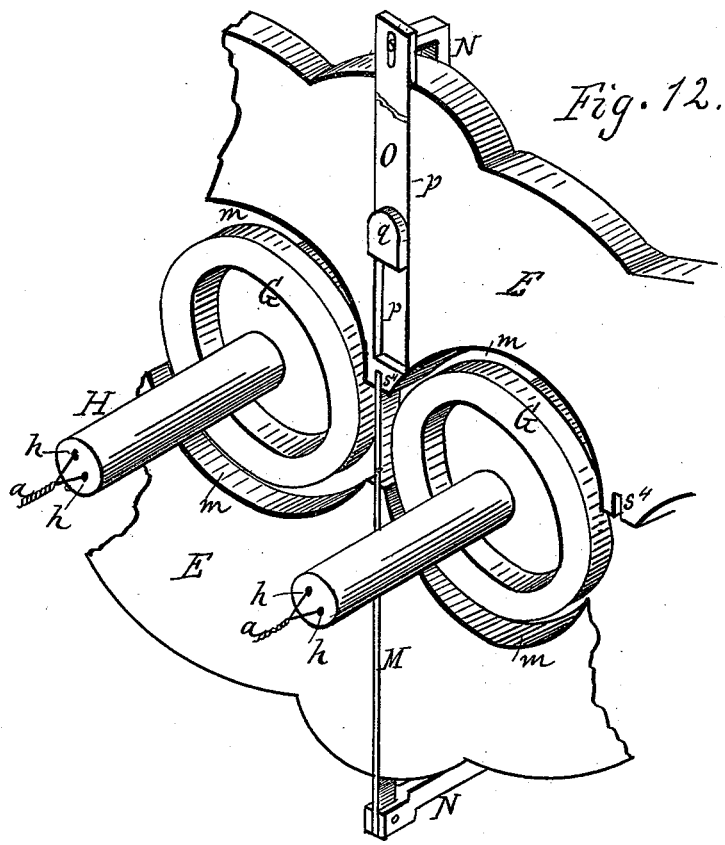
Figure 13:
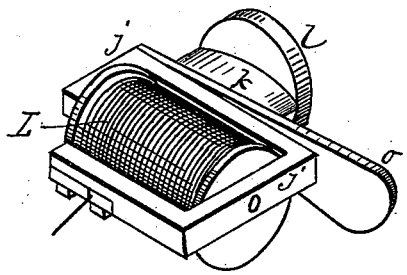

In the drawings, Figure 1 is a plan view of the machine. Fig. 2 is a cross-section in line 1 1, looking in front of the twisting-wheels. Fig. 3 is a similar cross-section in line 2 2 of Fig. 1, looking in the rear of the twisting-wheels. Fig. 4 is an enlarged rear elevation of the shifting arrangement connected with one of the twisting-wheels for changing the switches of the machine. Fig. 5 is a diagram showing an enlarged view of the shifting dog. Fig. 6 is an enlarged front elevation of two of the twisting-wheels, showing also one of the spools or bobbins and one of the dividers. Fig. 7 is a vertical cross-section of Fig. 6 in line 3 3. Fig. 8 is a vertical section of Fig. 7 in line 4 4. Fig. 9 is a vertical cross-section in line 5 5 of Fig. 6. Fig. 10 is a plan view, on an enlarged scale, of a fragment of the fence. Fig. 11 is a longitudinal section of one of the spindles, showing a modification in the twisting arrangement. Fig. 12 is a perspective view of a portion of the supporting-plate E, showing also two of the circular heads and two of the spindles. Fig. 13 is a perspective view of one of the filling-spools and its connections.

The form of fence produced by the machine is shown in Fig. 10, in which $a\ a$ indicate the longitudinal strands or cables, and $b\ b\ b$ the cross-connecting wires which produce the filling. Any desired number of the longitudinal strands may be used, usually five, and they may be in the form simply of single wires of proper size; but preferably they are made of two or more wires twisted together, as shown. The cross-wires $b\ b$ are carried from one strand or cable to another and twisted around them, standing in diagonal form and forming when the fence is complete lozenge or diamond shaped figures, as shown. To make this fence, the machine is constructed and arranged as follows:

A denotes the main frame, which may be of any desired construction.

B is a collapsible roller or form at one end of the frame, on which the completed fence is wound in roll form as fast as made.

D is a carrying-roller between the rocking frame and the collapsible form.

E is a supporting-plate extending across the main frame and serving as a support for the yokes of the filling-spool.

$F\ F'\ F^2\ F^3\ F^4$ are the operating-gears, of which there are as many as there are strands in the fence, five being shown in the drawings. These wheels are in the form of spur-gears, having teeth which engage and by which they all receive common motion.

$G\ G'\ G^2\ G^3\ G^4$ are circular heads on one face of the wheels, said heads each being provided with half-circular cavities or sockets $g\ g$, Figs. 7 and 8, to receive the shifting disks of the filling-spool yokes, as will be presently described.

H H H are hollow spindles, which pass centrally through the driving-wheels F F, forming the axes of the same and resting in suitable bearings on the main frame.

I I I are reels or holders, attached to the rear ends of the spindles and carrying spools J J J of wire, from which the longitudinal cables $a\ a$ are made when used in twisted form. The wires from these spools—two or more—pass through the spindles under proper tension and through holes $h\ h$, either at the end of the spindles, as in Fig. 7, or inside the spindles, as in Fig. 11, and are twisted up into a cable by the rotary motion of the spindle. This arrangement is only necessary where the strands are in the form of twisted cables. Slats can also be twisted into the cables as they are made on the machine by suitable means.

K, Fig. 1, is a sprocket-wheel, and $L^5$ a chain by which one of the driving-wheels is operated.

$i$ is a hand-crank for operating the drive-chain.

Other means may be used, and, if desired, the machine may be driven by power.

L L' L² L³ are a series of spools or bobbins, which carry the cross-wires $b\ b$. Four of these spools are used with the five driving-wheels, and the number increases or decreases with the number of driving-wheels and strands of wire. Each of these devices consists of the spool L, a yoke or frame $j$, in which the same is pivoted, and through one end of which the wire $b$ passes to extend to the longitudinal wire $a$, a double-wedge-shaped guide-bearing $k$, and a circular disk or wheel $l$ on the back side, the latter fitting loosely in the half-circular cavities or sockets $g\ g$ of the heads G G, before described. The double-wedge-shaped bearing $k$ rests loosely in a passage $m$ between the periphery of the head G and the edge $n$ of the opening in the bed-plate E, said passage forming a guideway, and the wedge-shaped bearing forming a pilot running in the guideway and carrying the spool with it. The spool is kept in position by means of a plate or flange $o$ on the side opposite from the wheel or disk $l$, said plate or flange also serving the purpose of turning the bearing to enter the groove of the next wheel by striking a switch on a slide, as will presently be described.

M M and M' M' are dividers, the same consisting of thin blades of steel, located in grooves or ways of the bed E and centrally between the circular heads G G. Two of these dividers stand above and two below the heads, as shown in Fig. 2. When drawn back away from the heads, they leave the passages $m$ between the heads open and connected; but when thrown in they divide said passages and leave each passage inclosed. When the dividers are forced in to separate the passages between the heads G, their inner ends strike into grooves $s^4\ s^4$ to stiffen them and hold them in place. Each of the dividers is connected by a bent arm N, Fig. 9, with a slide O, that runs in a way $p$ in the bed-plate E, said arm passing around the bed-plate and being of such length as to allow the proper vertical movement. When the dividers are thrown in to close the passage between the heads, the slide is thrown out, and vice versa. The inner end of the slide is provided with an outwardly-projecting lug $q$, Figs. 6 and 9, forming a switch against which the end of plate $o$ of the spool-yoke strikes in passing around, in order to deflect the bearing $k$ from one passage $m$ to another of the wheels.

$r$, Fig. 9, is a connecting-rod, pivoted to the back of each of the bent arms N and connecting said arms with a set of rock-levers P P P, pivoted centrally to standards $s\ s$ of the main frame. The ends of these rock-levers are connected one with another by pivoted links $t\ t\ t$.

$u$ is a slide, which slides up and down on a standard $v$, and the rock-lever P next to this slide is connected therewith by a pivoted link $t'$. When the slide is moved up and down on the standard $v$, the rock-levers P P P will all be operated through the medium of the several links $t'\ t\ t\ t$, and the dividers M M M' M' will be correspondingly thrown.

R R' are two arms, pivoted to the slide $u$ and extending up back of the driving-wheel F at one end of the series, the tops of said arms being connected by a spring $w$, whose tendency is to draw them toward each other. The arm R has a square-faced lug $y$ on the inner side, as shown in Fig. 4. The other arm R' has pivoted thereto a triangular-shaped dog $x$, Figs. 4 and 5, which is free to turn in either direction, but is limited in turning by means of a pin or stud $z$ on the arm, against which one of the points of the dog strikes.

$a^2$ is a light spring-rod, attached at one end to arm R' and at the other to the dog on one side of the center, and so arranged that as the dog is thrown the spring will be thrown from one side to the other of the pivoted center of the dog, to hold the dog in either position as it is thrown.

$b^2$ is a stationary spring, attached to some part of the main frame and resting over the upper outer spur of the dog for shifting the position of the dog as it goes up.

$d^2$ is a small crank-pin projecting from the back of the driving-wheel F in such position as to strike the upper inner spur of the dog $x$ in going down and the square-faced lug $y$ in going up, thereby correspondingly moving slide $u$ up and down and operating the dividers.

The operation of the machine is as follows: The wires passed through the several hollow spindles are twisted in the form of cables and form the longitudinal wires of the fence. As the several driving-wheels F F' F² F³ F⁴ are turned, the yokes of the several spools L L' L² L³ will receive forward motion through the passages $m\ m$ between the circular heads G G', &c. This is accomplished by the circular disks or wheels $l\ l$, fitting into the half-circular sockets or cavities $g\ g$ of the heads and being carried forward with the heads. These spools L L', &c., circle around the longitudinal strands $a\ a$ of the fence, and therefore the cross-wires $b\ b$ will be twisted around the main wires. Two full revolutions of each spool is given around each wire, during which time the dividers M are thrown in to close the connection between the passages $m\ m$, as indicated at the right and left in Fig. 2. At the end of the second twist the dividers will be opened or thrown back, leaving the communication between the two passages $m\ m$ open, and as the spool L passes from the upper side downward, the plate $o$ will strike the projecting switch $q$ of slide O and correspondingly deflect the wedge-shaped bearing $k$, so that instead of making another circuit around the spindle it has passed round before, it will pass into the second passage $m$ and make a circuit around the second head twice, in the same manner as before. At the moment of changing from one passage to the other the circular disk or wheel $l$ is transferred from the cavity $g$ of one head to the corresponding cavity $g$ of the other. These cavities come into coincidence as the wheels go around. In this manner spool L plays between the two heads G G', the spool $L^3$ between the heads $G^4$ $G^3$, the spool L' between the heads G' $G^2$, and the spool $L^2$ between the heads $G^2$ $G^3$, thus making the complete fence. $f^2$ is a counter-weight for producing proper reaction of the rock-levers P P P.

In order to time the movements of the dividers properly the upper inner spur of the triangular dog $x$ at the commencement rests above the stop $z$, so that the first circuit will only throw it down in contact with said stop without operating the arm R'. During this time the dividers close the passages between the two heads. At the next circuit the crank-pin $d^2$ strikes the point of the triangular dog before thrown down against the stop and forces the arm R' down, opening the dividers so that the spool-yoke can pass from one passage to the other. In the further movement of the crank-pin it strikes shoulder $y$ and closes the switch after the spool has entered the second passage. In the up movement of the arms R R' the upper outer point of the dog $x$ strikes the spring $b^2$, which tilts the dog and sets it in its former position again.

Having described my invention, what I claim as new, and desire to secure by Letters Patent, is—

1. In a machine for making wire fence, the combination of a set of revolving spindles provided with apertures for the passage and twisting of the wires, spools attached to one end of the spindles holding the wire to be twisted into the longitudinal strands of the fence, gears attached to the spindles for imparting common motion to them all, circular heads attached to the spindles and provided with coincident half-circular cavities, an inclosing-plate provided with circular openings corresponding with the heads and leaving guideways between said cavities and the heads, and spool-yokes provided with guide-bearings that rest in the guideways and with disks that rest in the cavities of the heads, the whole arranged to operate in the manner and for the purpose specified.

2. In a machine for making wire fence, the combination of spindles for the passage of the longitudinal wires, gears attached to the spindles and imparting common motion to all of them, circular heads attached to the spindles provided with coincident circular cavities, an inclosing-plate having circular openings surrounding the heads, and having guideways between the plate and heads, and spool yokes or carriers provided with double wedge-shaped bearings that run in the guideways and shift from one guideway to another and with circular disks that fit in the coincident cavities of the heads, as herein shown and described.

3. In a machine for making wire fence, the combination of hollow spindles, gears attached to the spindles, circular heads attached to the spindles provided with coincident half-circular cavities, a plate having circular openings inclosing the heads, and having intersecting guideways between the plate and heads, spool yokes or carriers provided with wedge-shaped bearings that run in the guideways and with disks that rest in the coincident cavities of the heads, and dividers that move in and out across the guideways between the heads, as shown and described, and for the purpose specified.

4. In a machine for making wire fence, the combination of hollow spindles, gears attached thereto, circular heads attached thereto, provided with coincident half-circular cavities, a plate having openings inclosing the heads and forming intersecting circular guideways, spool yokes or carriers provided with bearings that run in the guideways, disks that rest in the cavities of the heads, lugs that rest outside the plate, dividers that move in and out across the guideways between the heads, and slides connected with the dividers and provided with switches, against which the lugs of the spool-yokes strike to direct the yokes from one guideway to another, as herein shown and described.

5. In a machine for making wire fence, the combination, with the inclosing-plate having circular openings and with circular heads of less size than the openings, having intersecting guideways between them, of the dividers resting in grooves of the inclosing-plate and movable endwise to close the passages between the guideways, as herein shown and described, 6. In a machine for making wire fence, the combination, with the inclosing-plate and circular heads, of dividers resting in grooves of the plate between the heads and slides resting in grooves of the plate opposite from the dividers, the dividers and slides being connected by arms passing around the plate, as and for the purpose specified.

7. The combination, with the dividers, of the arms N, the connecting-rods $r$, the rock-levers P, the links $t$, the slide $u$, and arms R R', as shown and described, and for the purpose specified.

8. The combination, with the gear-wheel F, provided with the projecting pin $d^2$, of the slide $u$, the arms R R', pivoted thereto, the stop $y$ on arm R, the triangular dog $x$, pivoted to the arm R' and operating against a stop $z$ on said arm, the spring-rod $a^2$, connecting the arm with the dog on one side of its pivot, and the stationary spring $b^2$, located over said dog, as shown and described, and for the purpose specified.

In witness whereof I have hereunto signed my name in the presence of two subscribing witnesses.

JOHN H. TRACY.

Witnesses:
C. W. WEBSTER,
RICHARD HEIROG.